US007972016B2

(12) United States Patent
Yeh et al.

(10) Patent No.: US 7,972,016 B2
(45) Date of Patent: Jul. 5, 2011

(54) PROJECTOR SYSTEM WITH COMBINATED LIGHT SOURCES

(75) Inventors: Hsin-Tsung Yeh, Taipei Hsien (TW); Chun-Hsiang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 366 days.

(21) Appl. No.: 12/185,133

(22) Filed: Aug. 4, 2008

(65) Prior Publication Data

US 2009/0244489 A1    Oct. 1, 2009

(30) Foreign Application Priority Data

Mar. 28, 2008    (CN) .......................... 2008 1 0300781

(51) Int. Cl.
    *G03B 21/28*    (2006.01)
(52) U.S. Cl. ......................................................... 353/81
(58) Field of Classification Search .................... 353/20, 353/81, 28, 30–34, 102, 122; 359/621, 201, 359/204, 209, 454, 462; 349/5, 8, 9; 362/551, 561, 625

See application file for complete search history.

(56) References Cited

U.S. PATENT DOCUMENTS

| 5,517,000 | A | * | 5/1996 | Nishiwaki et al. | ....... | 219/121.77 |
| 6,075,648 | A | * | 6/2000 | Yamamoto et al. | ........... | 359/619 |
| 2005/0057729 | A1 | | 3/2005 | Huang | | |

* cited by examiner

*Primary Examiner* — Georgia Y Epps
*Assistant Examiner* — Don Williams
(74) *Attorney, Agent, or Firm* — Zhigang Ma

(57) ABSTRACT

A projector system includes a light source module and an integrator including a light receiving surface for receiving light from the light source module. The light source module includes a number of light sources for emitting parallel light, multiple sets of light-adjusting prisms corresponding to the light sources and a focusing lens arranged near the integrator. Light emitted from each of the light sources is refracted by the corresponding set of light-adjusting prisms, and then focused by the focusing lens to the light receiving surface of the integrator, and forms into a converging light cone with the apex being at the light receiving surface of the integrator. An angle of the light cone is 1/N of a cone formed by the light without being refracted, where N is number of the light sources and is greater than 1.

14 Claims, 3 Drawing Sheets

PROJECTOR SYSTEM WITH COMBINATED LIGHT SOURCES

BACKGROUND

1. Field of the Invention

The present invention relates to a projector system and, particularly, to a projector system with combined light sources.

2. Description of the Related Art

In a projector system, an integrator is arranged in a light path of a light source to enhance the uniformity of light emitted from the light source. To enhance the brightness of the projector system, two or more light sources may be used. Generally, the light source includes an elliptical cover and a light emitting portion received in the elliptical cover. Light emitted from each light emitting portion is reflected by the corresponding elliptical cover to directly propagate to a light receiving surface of the integrator. However, the two elliptical covers are combined together in a ϵ-shaped fashion, and the two light emitting portions are received in two chambers defined by the two elliptical covers respectively. Light reflected by a combined portion of the two elliptical covers may be lost, resulting in an inadequate use of the light.

Therefore, what is needed is to provide a projector system in which the above problem is eliminated or at least alleviated.

SUMMARY

An exemplary projector system includes a light source module and an integrator, which comprises a light receiving surface for receiving light from the light source module. The light source module includes a number of light sources for emitting parallel light, multiple sets of light-adjusting prisms corresponding to the light sources, and a focusing lens arranged near the integrator. Initially, light emitted from each of the light sources is refracted by the corresponding set of light-adjusting prisms. The light is then focused by the focusing lens to the light receiving surface of the integrator and forms into a converging light cone with the apex being at the light receiving surface of the integrator. An angle of the light cone is 1/N of a cone formed by the light without being refracted, where N is number of the light sources and is greater than 1.

Other advantages and novel features of the present invention will become more apparent from the following detailed description of exemplary embodiments when taken in conjunction with the accompanying drawings.

DETAILED DESCRIPTION

Figure 1:
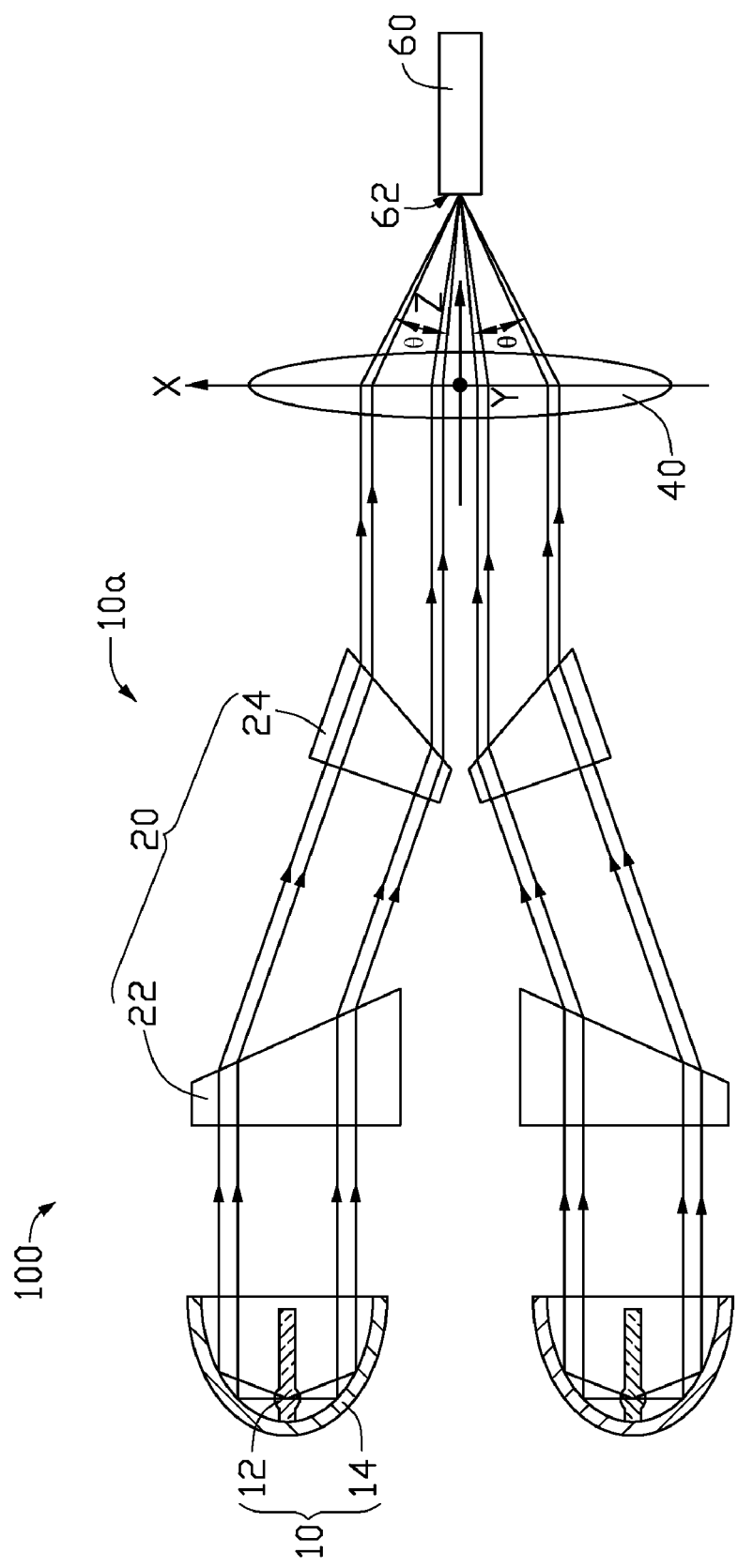
FIG. 1 is a schematic view of a projector system according to a first exemplary embodiment.
Figure 2:
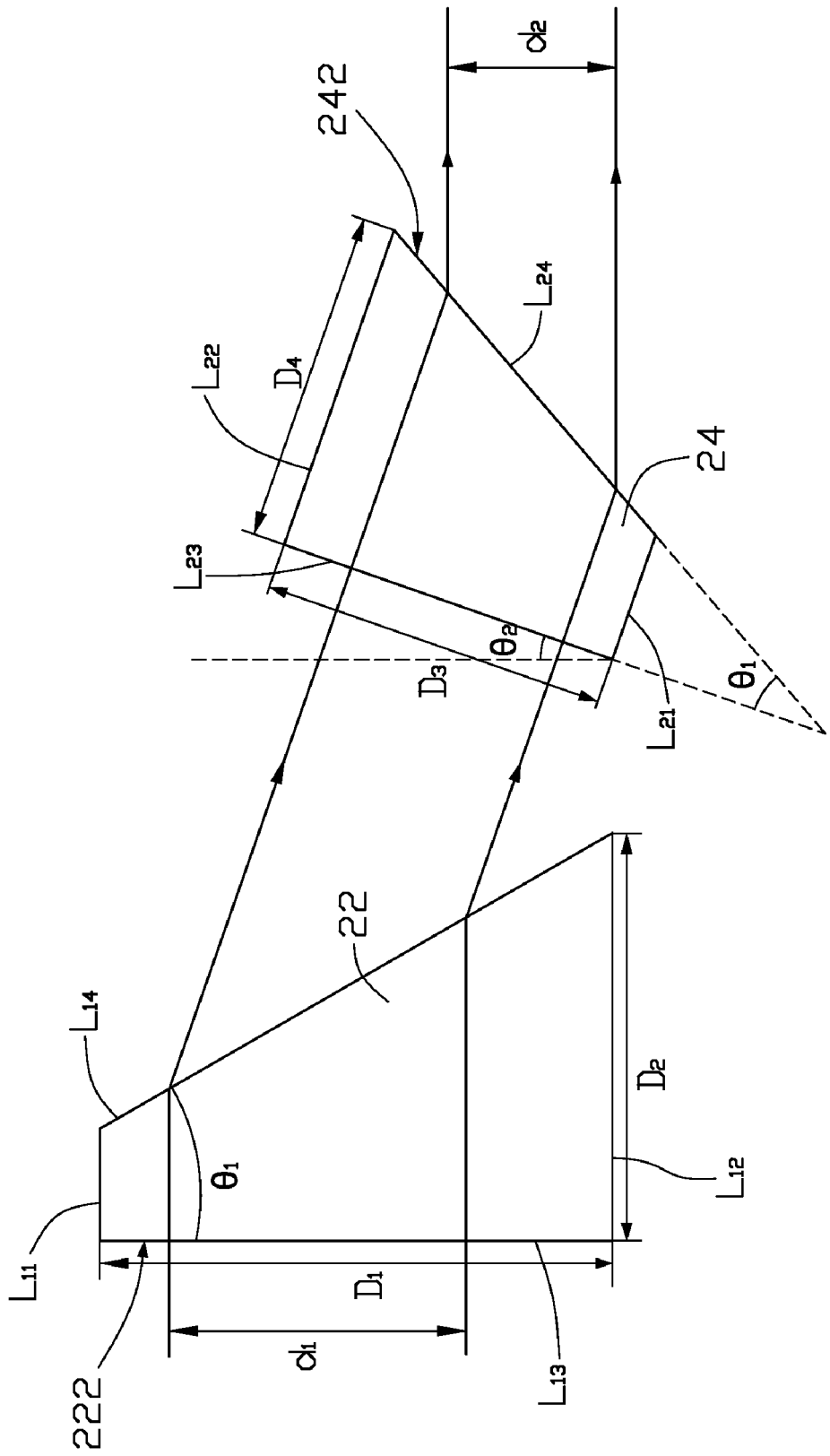
FIG. 2 is an enlarged view of a set of light-adjusting prisms of the projector system of FIG. 1, showing a compressing process for light.

Referring to FIGS. 1 and 2, a projector system 100 in accordance with a first exemplary embodiment includes a light source module 10a and an integrator 60. The light source module 10a includes two light sources 10, two sets of light-adjusting prisms 20 corresponding to the two light sources 10, and a focusing lens 40. Each set of light-adjusting prisms 20 is positioned between the corresponding light source 10 and the focusing lens 40. Light emitted from the light sources 10 is finally merged into the integrator 60 through a light receiving surface 62 of the integrator 60.

Each light source 10 includes a cover 14 and a light emitting portion 12 received in the cover 14. The cover 14 is parabolic-shaped and the light emitting portion 12 is positioned at a focal point of the cover 14. Generally, the light emitting portion 12 is a metal halide lamp, a high-voltage mercury lamp, or a white light emitting diode for emitting white light.

Each set of light-adjusting prisms 20 includes a first prism 22 and a second prism 24 arranged in that order along the light path from the corresponding light source 10 to the integrator 60. In this embodiment, both the first prism 22 and the second prism 24 are right-angled trapezoidal prisms. Referring to FIG. 2, two parallel sides of the first prism 22 are represented as an upper side $L_{11}$ and a lower side $L_{12}$, respectively. The right-angled side of the first prism 22 connecting the upper side $L_{11}$ and the lower side $L_{12}$ is represented as $L_{13}$, and the hypotenuse of the first prism 22 is represented as $L_{14}$. Two parallel sides of the second prism 24 are represented as an upper side $L_{21}$ and a lower side $L_{22}$, respectively. The right-angled side of the second prism 24 connecting the upper side $L_{21}$ and the lower side $L_{22}$ is represented as $L_{23}$, and the hypotenuse of the second prism 24 is represented as $L_{24}$.

The vertex angle of the first prism 22 (i.e., an acute angle formed by extended lines of the right-angled side $L_{13}$ and the hypotenuse $L_{14}$ of the first prism 22) is equal to that of the second prism 24 (i.e., an acute angle formed by extended lines of the right-angled side $L_{23}$ and the hypotenuse of the second prism 24), which is represented as $\theta_1$. The right-angled side $L_{23}$ of the second prism 24 is inclined relative to the right-angled side $L_{13}$ of the first prism 22 by an angle $\theta_2$. The length of the right-angled side $L_{13}$ of the first prism 22 is represented as $D_1$, and the length of the lower side $L_{12}$ of the first prism 22 is represented as $D_2$. The length of the right-angled side $L_{23}$ of the second prism 24 is represented as $D_3$, and the length of the lower side $L_{22}$ of the second prism 24 is represented as $D_4$. The refractive indexes of the first prism 22 and the second prism 24 are equal and represented as $n_1$.

Referring to FIG. 1, in this embodiment, a three-dimensional coordinate system is established. An X-Y plane of the three-dimensional coordinate system is perpendicular to the optical axis of the focusing lens 40 and intersects the optical axis of the focusing lens 40 at the optical center of the focusing lens 40. The optical axis of the focusing lens 40 is the Z-axis of the three-dimensional coordinate system.

Referring to FIG. 2, light emitted from the light emitting portion 12 of each light source 10 is reflected by the cover 14 to propagate in parallel to the light receiving surface $222/L_{13}$ of the first prism 22 to form a circular light spot on the light receiving surface 222. The diameter of the circular light spot is represented as $d_1$. The light sequentially passes through the first prism 22 and the second prism 24, and is compressed to form an elliptical light spot on the light emitting surface $242/L_{24}$ of the second prism 24. The long axis of the elliptical light spot is along the Y-axis of the coordinate system, and the short axis of the elliptical light is along the X-axis of the coordinate system. The length of the long axis of the elliptical light spot is equal to the diameter $d_1$ of the circular light spot, and the length of the short axis of the elliptical light spot is represented as $d_2$. In this embodiment, $d_2/d_1 = 1/2$.

For merging light emitted from the two light sources 10 into the integrator 60, in this embodiment, each converging light cone is formed by focusing the elliptical light spot formed on the light emitting surface 242 of each second prism 24, and an angle of each converging light cone with the apex being at the light receiving surface 62 of the integrator 60 is ½ of that of a light cone formed by the light without being refracted by the each set of light-adjusting prisms 20. Referring to FIG. 1, the angle of each converging light cone with the apex being at the light receiving surface 62 of the integrator 60 is labeled as θ. For example, if the desired total angle of a light cone of the light coupled to the integrator 60 is 30°, the angle of each converging light cone, i.e., θ, is 15°.

To satisfy the above light cone distribution of light emitted from each light source 10, a relationship between $d_2$ and $d_1$ is found using the formula:

$$d_2/d_1 = (\cos(\arcsin(n_1 \sin \theta_1)))^2/(\cos \theta_1)^2 \quad (1),$$

and a relationship between $\theta_1$ and $\theta_2$ is found using the formula:

$$\theta_2 = \arcsin(n_1 \sin \theta_1) - \theta_1 \quad (2).$$

In this embodiment, $n_1=1.5168$, $d_2/d_1=\frac{1}{2}$, therefore, $\theta_1=32°$ using the formula (1), and $\theta_2=21.5°$ using the formula (2). For an exemplary compact size of the projector system, $D_1=60$ millimeters (mm), $D_2=48.75$ mm, $D_3=40$ mm, and $D_4=34$ mm.

Figure 3:
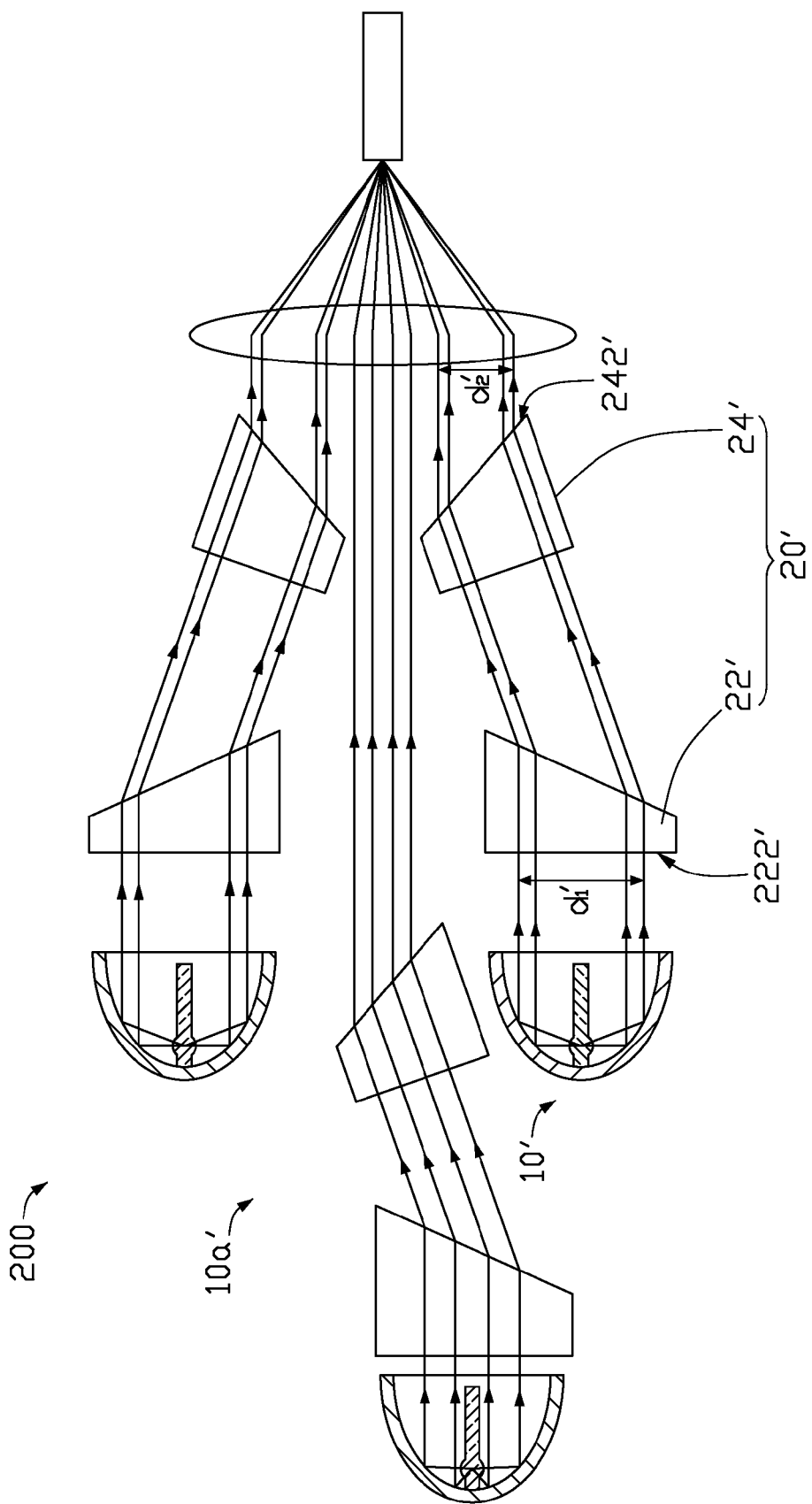
FIG. 3 is a schematic view of a projector system according to a second exemplary embodiment.

Referring to FIG. 3, a projector system 200 in accordance with a second exemplary embodiment is shown. The differences between the projector system 200 of the this exemplary embodiment and the projector system 100 of the first exemplary embodiment are that the light source module 10a' of the projector system 200 includes three light sources 10' and three sets of light-adjusting prisms 20' corresponding to the three light sources 10', respectively.

In this embodiment, the ratio of the length $d_2'$ of the short axis of an elliptical light spot formed on the light emitting surface 242' of each second prism 24' to the diameter $d_1'$ of a circular light spot formed on the light incident surface 222' of each first prism 22' is equal to ⅓, i.e., $d_2'/d_1'=\frac{1}{3}$.

It is to be understood that, in other embodiments, the light source module of the projector system may include N light sources and N sets of light-adjusting prisms corresponding to the N light sources. The ratio of the length $d_2''$ of the short axis of an elliptical light spot formed on the light emitting surface of each second prism to the diameter $d_1''$ of a circular light spot formed on the light incident surface of each first prism is equal to 1/N, i.e., $d_2''/d_1''=1/N$, wherein N is a natural number.

Light emitted from each light source is merged into the integrator of the projector system satisfactorily using a number of sets of light-adjusting prisms. As a result, the light usage is enhanced significantly.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projector system comprising:
   a light source module, the light source module comprising a plurality of light sources capable of emitting parallel light, a plurality of sets of light-adjusting prisms corresponding to the plurality of light sources, and a focusing lens; the plurality of sets of light-adjusting prisms arranged between the plurality of light sources and the focusing lens; and
   an integrator including a light receiving surface for receiving light from the light source module, the integrator arranged at a side of the focusing lens opposite to the light-adjusting prisms;
   wherein light emitted from each of the light sources is refracted by the corresponding set of light-adjusting prisms, and then focused by the focusing lens to the light receiving surface of the integrator, and forms into a converging light cone with the apex being at the light receiving surface of the integrator, and an angle of the light cone is 1/N of that of a light cone formed by the light without being refracted, where N is the number of the light sources and is greater than 1.

2. The projector system as claimed in claim 1, wherein each of the plurality of light sources includes a cover and a light-emitting portion received in the cover.

3. The projector system as claimed in claim 2, wherein the cover is a parabolic-shaped cover.

4. The projector system as claimed in claim 1, wherein each set of the light-adjusting prisms includes a first prism and a second prism arranged in order along the light path associated with the light source module.

5. The projector system as claimed in claim 4, wherein the first prism and the second prism are right-angled trapezoidal prisms.

6. The projector system as claimed in claim 1, wherein the plurality of light sources are two light sources and the plurality of sets of light-adjusting prisms are two sets of light-adjusting prisms corresponding to the two light sources, respectively, and N is equal to 2.

7. The projector system as claimed in claim 1, wherein the plurality of light sources are three light sources and the plurality of sets of light-adjusting prisms are three sets of light-adjusting prisms corresponding to the three light sources, respectively, and N is equal to 3.

8. A light source module for a projector system with an integrator including a light receiving surface for receiving light from the light source module, the light source module comprising:
   a plurality of light sources capable of emitting parallel light;
   a plurality of sets of light-adjusting prisms corresponding to the plurality of light sources;
   a focusing lens; the plurality of sets of light-adjusting prisms arranged between the plurality of light sources and the focusing lens; and
   an integrator including a light receiving surface for receiving light from the light source module, the integrator arranged at a side of the focusing lens opposite to the light-adjusting prisms;
   wherein light emitted from each of the light sources is refracted by the corresponding set of light-adjusting prisms, and then focused by the focusing lens to the light receiving surface of the integrator, and forms into a converging light cone with the apex being at the light receiving surface of the integrator, and an angle of the light cone is 1/N that of a light cone formed by the light without being refracted, where N is the number of the light sources and is greater than 1.

9. The light source module as claimed in claim 8, wherein each of the plurality of light sources includes a cover and a light-emitting portion received in the cover.

10. The light source module as claimed in claim 9, wherein the cover is a parabolic-shaped cover.

11. The light source module as claimed in claim 8, wherein each set of the light-adjusting prisms includes a first prism and a second prism arranged in order along the light path associated with the light source module.

12. The light source module as claimed in claim 11, wherein both of the first prism and the second prism are right-angled trapezoidal prisms.

13. The light source module as claimed in claim 8, wherein the plurality of light sources are two light sources and the plurality of sets of light-adjusting prisms are two sets of light-adjusting prisms corresponding to the two light sources, respectively, and N is equal to 2.

14. The light source module as claimed in claim 8, wherein the plurality of light sources are three light sources and the plurality of sets of light-adjusting prisms are three sets of light-adjusting prisms corresponding to the three light sources, respectively, and N is equal to 3.

* * * * *